United States Patent
Wang et al.

(10) Patent No.: US 10,816,352 B2
(45) Date of Patent: Oct. 27, 2020

(54) METHOD AND SYSTEM FOR ESTIMATING TIME OF ARRIVAL

(71) Applicant: BEIJING DIDI INFINITY TECHNOLOGY AND DEVELOPMENT CO., LTD., Beijing (CN)

(72) Inventors: Zheng Wang, Beijing (CN); Kun Fu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 322 days.

(21) Appl. No.: 15/927,073

(22) Filed: Mar. 20, 2018

(65) Prior Publication Data
US 2018/0209808 A1    Jul. 26, 2018

Related U.S. Application Data

(63) Continuation of application No. PCT/CN2017/086530, filed on May 31, 2017.

(30) Foreign Application Priority Data

Jan. 10, 2017   (CN) .......................... 2017 1 0016048

(51) Int. Cl.
*G01C 21/36* (2006.01)
*G06N 3/04* (2006.01)
(Continued)

(52) U.S. Cl.
CPC ..... *G01C 21/3617* (2013.01); *G01C 21/3453* (2013.01); *G01C 21/3691* (2013.01);
(Continued)

(58) Field of Classification Search
None
See application file for complete search history.

(56) References Cited

U.S. PATENT DOCUMENTS 6,317,088 B1   11/2001   Ran
7,376,509 B2    5/2008   Endo et al.
(Continued)

FOREIGN PATENT DOCUMENTS

CN          101673463 A     3/2010
CN          102081859 B    10/2014
(Continued)

OTHER PUBLICATIONS

Ranhee Jeong and Laurence R. Rilett, 'Prediction Model of Bus Arrival Time for Real-Time Applications' (Year: 2005).*
(Continued)

*Primary Examiner* — Jonathan M Dager
*Assistant Examiner* — Garrett F Evans
(74) *Attorney, Agent, or Firm* — Metis IP LLC

(57) ABSTRACT

The present disclosure relates to a method and system for determining an estimated time of arrival relating to a target trip. The method includes extracting, by a processor, sample characteristic data relating to a target trip, wherein the sample characteristic data comprises first feature data corresponding to a route relating to the target trip and second feature data corresponding to a link of the route; obtaining a prediction model for estimating time of arrival; and determining, by the processor, an estimated time of arrival (ETA) relating to the target trip based on the prediction model and the sample characteristic data.

16 Claims, 9 Drawing Sheets

(51) Int. Cl.
  *G06K 9/62* (2006.01)
  *G01C 21/34* (2006.01)
  *G06N 20/00* (2019.01)

(52) U.S. Cl.
  CPC ......... *G06K 9/6256* (2013.01); *G06N 3/0481* (2013.01); *G06N 20/00* (2019.01)

(56) References Cited

U.S. PATENT DOCUMENTS

| | | | |
|---|---|---|---|
| 9,037,519 B2* | 5/2015 | Han | G06N 3/0454 706/12 |
| 2008/0004794 A1 | 1/2008 | Horvitz | |
| 2008/0103686 A1 | 5/2008 | Alberth et al. | |
| 2014/0288821 A1 | 9/2014 | Modica et al. | |
| 2015/0006071 A1* | 1/2015 | Cai | G01C 21/3492 701/400 |
| 2015/0130600 A1 | 5/2015 | Huang | |
| 2016/0202074 A1 | 7/2016 | Woodard et al. | |
| 2017/0138751 A1* | 5/2017 | Martyniv | G06Q 10/02 |
| 2017/0314950 A1* | 11/2017 | Tian | G01C 21/3492 |

FOREIGN PATENT DOCUMENTS

| | | |
|---|---|---|
| CN | 104637334 A | 5/2015 |
| CN | 105679021 A | 6/2016 |
| CN | 105894848 A | 8/2016 |
| CN | 106017496 A | 10/2016 |
| CN | 106096767 A | 11/2016 |
| EP | 2323115 A1 | 5/2011 |
| JP | H0877485 A | 3/1996 |
| JP | H1079096 A | 3/1998 |
| JP | 2003272084 A | 9/2003 |
| JP | 2016161501 A | 9/2016 |
| WO | 2012062760 A1 | 5/2012 |
| WO | 2014112249 A1 | 7/2014 |
| WO | 2014170434 A1 | 10/2014 |
| WO | WO2016174745 A1 | 11/2016 |

OTHER PUBLICATIONS

The Extended European Search Report in European Application No. 17844615.9 dated Jun. 25, 2019, 15 pages.

Mehmet Altinkaya et al., Urban Bus Arrival Time Prediction: A Review of Computational Models, International Journal of Recent Technology and Engineering, 2(4): 164-169. 2013.

First Office Action in Chinese Application No. 201710016043.5 dated Dec. 2, 2019, 21 pages.

Examination Report in Australian Application No. 2017317611 dated Dec. 7, 2018, 6 pages.

International Search Report in PCT/CN2017/086530 dated Sep. 28, 2017, 5 pages.

Written Opinion in PCT/CN2017/086530 dated Sep. 28, 2017, 4 pages.

* cited by examiner

METHOD AND SYSTEM FOR ESTIMATING TIME OF ARRIVAL

CROSS-REFERENCE TO RELATED APPLICATION

This application is a Continuation of International Application No. PCT/CN2017/086530, filed on May 31, 2017, which claims priority of Chinese Application No. 201710016048.5 filed on Jan. 10, 2017, the entire contents of which are hereby incorporated by reference.

TECHNICAL FIELD

This application relates generally to machine learning and mapping services, and in particular, to a system and method for estimating time of arrival using machine learning techniques.

BACKGROUND

Many location-based services and/or applications, such as web mapping services, navigation services, and online on-demand transportation services, may need accurate estimated time of arrival (ETA) to provide services. For example, a mapping service may need automatically update ETA for a vehicle in real time to provide driving directions, navigation suggestions, positioning information, and other information of the mapping service to users.

SUMMARY OF THE INVENTION

In one aspect of the present disclosure, a system is provided. The system may include a computer-readable storage medium storing a set of instruction for determining an estimated time of arrival relating to a trip; a processor in communication with the computer-readable storage medium, wherein when executing the set of instructions, the processor is directed to: extract, sample characteristic data relating to a target trip, wherein the sample characteristic data includes first feature data corresponding to a route relating to the target order and second feature data corresponding to a link of the route; obtain, a prediction model for estimating time of arrival; and determine an estimated time of arrival (ETA) relating to the target trip based on the prediction model and the sample characteristic data.

In another aspect of the present disclosure, a method is provided. The method may include extracting, by a processor, sample characteristic data relating to a target trip, wherein the sample characteristic data includes first feature data corresponding to a route relating to the target trip and second feature data corresponding to a link of the route; obtaining a prediction model for estimating time of arrival; determining hidden state information based on the prediction model and the second feature data; and determining, by the processor, an estimated time of arrival (ETA) relating to the target trip based on the prediction model and the first feature data.

In some embodiments, the link of the route may correspond to at least a portion of the route.

In some embodiments, the determining the estimated time of arrival relating to the target trip may further include determining hidden state information based on the prediction model and the second feature data; and determining the estimated time of arrival relating to the target trip based at least in part on the hidden state information.

In some embodiments, the method may further include obtaining one or more historical trips; grouping the one or more historical orders into one or more groups based on data of links relating to the one or more historical trips, wherein the one or more historical trips are associated with a plurality of routes including the links; extracting historical characteristic data and historical time of arrival data for each of the one or more groups of historical trips; generating the training data based on the historical characteristic data and the historical time of arrival data; and determining the prediction model based on the training data.

In some embodiments, to determine the prediction model, the method may further include identifying, from the one or more historical orders, a first plurality of training orders and a second plurality of training orders; extracting first historical characteristic data and first historical time of arrival data relating to the first plurality of training orders; determining a first ETA determination model based on the first historical characteristic data and the first historical time of arrival; extracting second historical characteristic data and second historical time of arrival data relating to the second plurality of training orders; modifying the first ETA determination model based on the second historical characteristic data and the second historical time of arrival data to determine a second ETA determination model; determining whether a matching condition is satisfied based on at least one of the first ETA determination model or the second ETA determination model; and determining the second ETA determination model as the prediction model, in response to determining that the matching condition is satisfied. In some embodiments, the method further includes determining a loss function based on at least one of the first ETA determination model or the second ETA determination model; and determining whether the loss function converges to a first value.

In some embodiments, the method may further include selecting, from the one or more historical trips, a third plurality of historical trips; determining an error based on third historical characteristic data and third historical time of arrival data relating to the third plurality of historical trips; and determining whether the error is less than a second value.

In some embodiments, the prediction model may include at least one of a time series model or a regression model.

In some embodiments, the time series model may include a recurrent neural network. In some embodiments, the regression model may include a multilayer perceptron.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

Figures herein are provided for further understanding of the present disclosure, and constitute a part of this present disclosure. The exemplary embodiments of the present disclosure and the description are used to explain the present disclosure, and not intended to be limiting. In the drawing, the like reference numerals denote the same parts.

DETAIL DESCRIPTION

Figure 1:
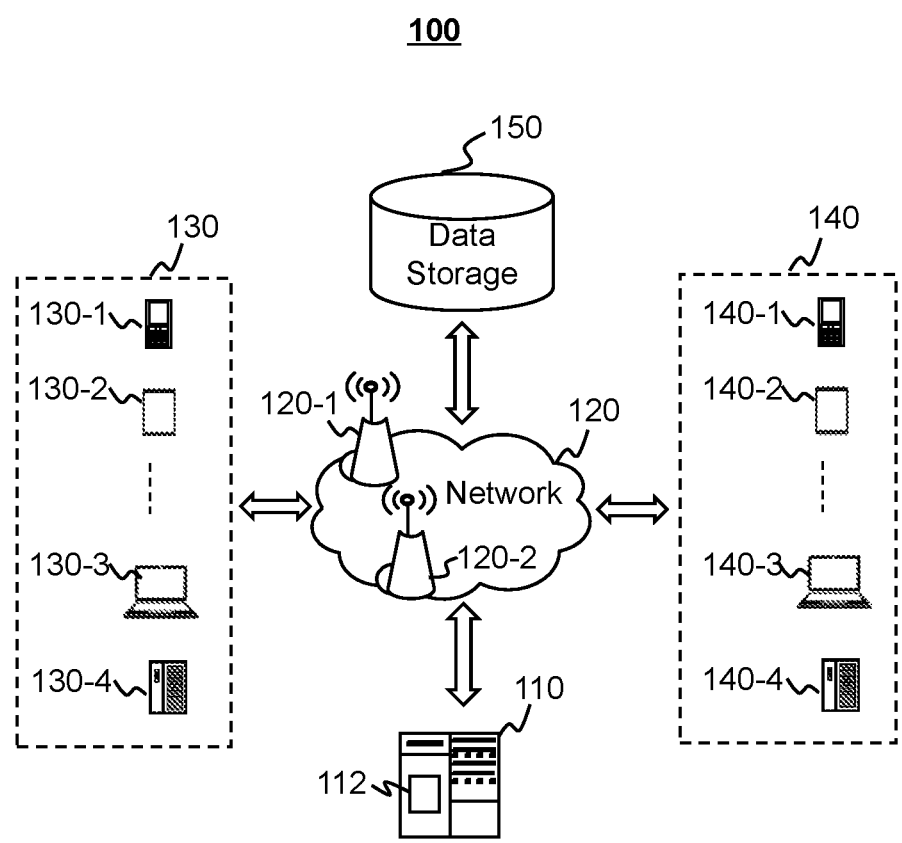
FIG. 1 is a block diagram of an exemplary system for on-demand transportation service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to process service orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity that may request a service, order a service, provide a service, or facilitate the providing of the service. For example, the user may be a passenger, a driver, an operator, or the like, or any combination thereof. In the present disclosure, "passenger," "user equipment," "user terminal," and "passenger terminal" may be used interchangeably, and "driver" and "driver terminal" may be used interchangeably.

The term "service request" refers to a request that may be initiated by a user (e.g., a passenger, a requester, an operator, a service requester, a customer, a driver, a provider, a service provider, a supplier). The service request may relate to a trip between two or more locations. In some embodiments, the trip may include an order initiated by a passenger in a taxi transportation service system. The service request may be chargeable or free.

The system may find applications in many fields, e.g., a taxi transportation service, a driving application, a distributing application, a map application, or a navigation application.

In accordance with some embodiments of the present disclosure, service requests may be processed using one or more machine learning algorithms, such as a neural network algorithm, a sort algorithm, a regression algorithm, an instance-based algorithm, a normalized algorithm, a decision tree algorithm, a Bayesian algorithm, a clustering algorithm, an association rule algorithm, a deep learning algorithm, and a reduced dimension algorithm, or the like, or any combination thereof. For example, the neural network algorithm may include a recurrent neural network, a perceptron neural network, a Hopfield network, a self-organizing map (SOM), or a learning vector quantization (LVQ), etc. The regression algorithm may include a logistic regression, a stepwise regression, a multivariate adaptive regression spline, a locally estimated scatterplot smoothing, etc. The sort algorithm may include an insert sort, a selection sort, a merge sort, a heap sort, a bubble sort, a shell sort, a comb sort, a counting sort, a bucket sort, a radix sort, or the like, or any combination thereof. The instance-based algorithm may include a k-nearest neighbor (KNN), a learning vector quantization (LVQ), a self-organizing map (SOM), etc. The normalized algorithm may include a RIDge regression, a least absolute shrinkage and selection operator (LASSO), or an elastic net. The decision tree algorithm may include a classification and regression tree (CART), an Iterative Dichotomiser 3 (ID3), a C4.5, a chi-squared automatic interaction detection (CHAID), a decision stump, a random forest, a multivariate adaptive regression spline (MARS), or a gradient boosting machine (GBM), etc. The Bayesian algorithm may include a naive Bayesian algorithm, an averaged one-dependence estimators (AODE) or a Bayesian belief network (BBN), etc. The kernel-based algorithm may include a support vector machine (SVM), a radial basis function (RBF), or a linear discriminate analysis (LDA), etc. The clustering algorithm may include a k-means clustering algorithm, a fuzzy c-mean clustering algorithm, a hierarchical clustering algorithm, a Gaussian clustering algorithm, a MST based clustering algorithm, a kernel k-means clustering algorithm, a density-based clustering algorithm, or the like. The association rule algorithm may include an Apriori algorithm or an Eclat algorithm, etc. The deep learning algorithm may include a restricted Boltzmann machine (RBN), a deep belief networks (DBN), a convolutional network, a stacked autoencoders, etc. The reduced dimension algorithm may include a principle component analysis (PCA), a partial least square regression (PLS), a Sammon mapping, a multi-dimensional scaling (MDS), a Projection Pursuit, etc.

An aspect of the present disclosure relates to online systems and method for determining an estimated time of arrival relating to a trip (e.g., an order initiated by a passenger). To this end, the system may first obtain the trip from a terminal associated with a service requester; and then extract characteristic data relating to the trip; and then obtain a prediction model for determining estimated time of arrival; and then determine the estimated time of arrival relating to the trip based on the prediction model and the characteristic data. Since the characteristic data includes feature data corresponding to a route relating to the trip and feature data corresponding to at least one link of the route, it may improve the accuracy of estimating time of arrival relating to the trip.

As described above, the technical problem and solution may be rooted in online on-demand transportation service, which is a new form of service further rooted only in post-Internet era. It provides technical solutions to users (e.g., service requesters) and service providers (e.g., drivers) that could raise only in post-Internet era. In pre-Internet era, when a user hails a taxi on street, the taxi request and acceptance occur only between the passenger and one taxi driver that sees the passenger, If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service providers to respond to the service request simultaneously and in real-time. Therefore, through Internet, the online on-demand transportation systems may provide a much more efficient transaction platform for the users and the service providers that may never met in a traditional pre-Internet transportation service system. When the system receives an order (a trip) from passenger, the system may determine an estimated time of arrival relating to the order. Based on the estimated time of arrival, the passenger may schedule his/her time. Based on the estimated time of arrival, the system may combine the order with other orders together and send the combination result to a driver to make the allocation of orders more reasonable.

FIG. 1 is a block diagram of an exemplary on-demand service system 100 according to some embodiments. For example, the on-demand service system 100 may be an online transportation service platform for transportation service such as taxi hailing, chauffeur service, express car, carpool, bus service, driver hire and shuttle service. The on-demand service system 100 may be an online platform including a server 110, a network 120, one or more user terminals (e.g., one or more passenger terminals 130, driver terminals 140), and a data storage 150. The server 110 may include a processing engine 112. It should be noted that the on-demand service system 100 shown in FIG. 1 is merely an example, and not intended to be limiting. In some embodiments, the on-demand service system 100 may include the passenger terminals) 130 or the driver terminal(s) 140. For example, in a navigation system, a user may user a navigation application installed in his/her terminal to navigate his/her trip between two locations, and the system may determine an estimated time of arrival relating to the trip. The use of "passenger" and "service provider/driver/driver terminal" is regarded to the online transportation service platform. When "service requester," "user," "user terminal," "terminal," or "user equipment" is used, it is regarded to all location-based service (LBS) including the online transportation service and the navigation service.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals (e.g., the one or more passenger terminals 130, driver terminals 140), and/or the data storage 150 via the network 120. As another example, the server 110 may be directly connected to the one or more user terminals (e.g., the one or more passenger terminals 130, driver terminals 140), and/or the data storage 150 to access stored information and/or data, In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions description in the present disclosure. For example, the processing engine 112 may determine an estimated time of arrival based on the service request obtained from the one or more passenger terminals 130. In some embodiments, the processing engine 112 may include one or more processing engines (e.g., signal-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 110 (e.g., the service 110, the one or more passenger terminals 130 the one or more driver terminal 140, or the data storage 150) may send information and/data to other component(s) in the on-demand service system 110 via the network 120. For example, the server 110 may obtain/acquire service request from the passenger terminal 130 via the network 120. In some embodiments, the network 120 may be any type of wired or wireless network, or any combination thereof. Merely by way of example, the network 120 may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points, For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the passenger terminal 130. In some embodiments, the user of the passenger terminal 130 may be someone other than the service requester. For example, a user A of the passenger terminal 130 may use the passenger terminal 130 to send a service request for a user B, or receive service and/or information or instructions from the server 110. In some embodiments, a provider may be a user of the driver terminal 140. In some embodiments, the user of the driver terminal 140 may be someone other than the provider. For example, a user C of the driver terminal 140 may use the driver terminal 140 to receive a service request for a user D, and/or information or instructions from the server 110.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smart-phone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the passenger terminal 130 may be a device with positioning technology for locating the position of the service requester and/or the passenger terminal 130.

In some embodiments, the driver terminal 140 may be similar to, or the same device as the passenger terminal 130. In some embodiments, the driver terminal 140 may be a device with positioning technology for locating the position of the driver and/or the driver terminal 140. In some embodiments, the passenger terminal 130 and/or the driver terminal 140 may communicate with other positioning device to determine the position of the service requester, the passenger terminal 130, the driver, and/or the driver terminal 140. In some embodiments, the passenger terminal 130 and/or the driver terminal 140 may send positioning information to the server 110.

The data storage 150 may store data and/or instructions. In some embodiments, the data storage 150 may store data obtained from the one or more user terminals (e.g., the one or more passenger terminals 130, driver terminals 140). In some embodiments, the data storage 150 may store data and/or instructions that the server 110 may execute or use to perform exemplary methods described in the present disclosure. In some embodiments, the data storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the data storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the data storage 150 may be connected to the network 120 to communicate with one or more components in the on-demand service system 100 (e.g., the server 110, the one or more user terminals, etc.). One or more components in the on-demand service system 100 may access the data and/or instructions stored in the data storage 150 via the network 120. In some embodiments, the data storage 150 may be directly connected to or communicate with one or more components in the on-demand service system 100 (e.g., the server 110, the one or more user terminals, etc.). In some embodiments, the data storage 150 may be part of the server 110.

In some embodiments, one or more components in the on-demand service system 100 (e.g., the server 110, the one or more user terminals, etc.) may have a permission to access the data storage 150. In some embodiments, one or more components in the on-demand service system 100 may read and/or modify information relating to the service requester, driver, and/or the public when one or more conditions are met. For example, the server 110 may read and/or modify one or more users' information after a service. As another example, the driver terminal 140 may access information relating to the service requester when receiving a service request from the passenger terminal 130, but the driver terminal 140 may not modify the relevant information of the service requester.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
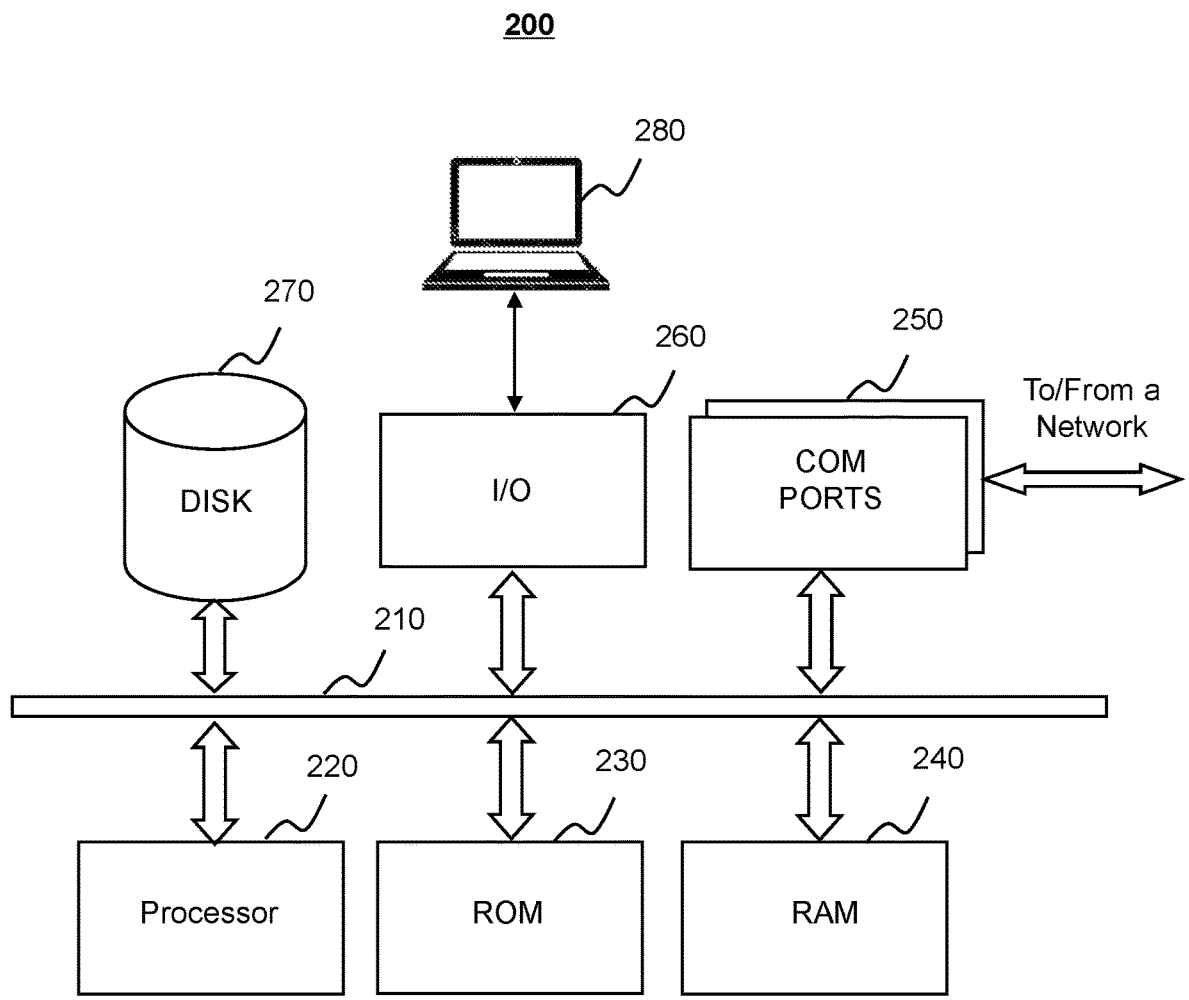
FIG. 2 is a block diagram of an exemplary computing device according to some embodiments of the present disclosure.

FIG. 2 is a schematic diagram illustrating exemplary hardware and software components of a computing device 200 on which the server 110, the one or more user terminals (e.g., the one or more passenger terminals 130, driver terminals 140) may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer, both may be used to implement an on-demand service system 100 for the present disclosure. The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components therein such as user interface elements 280, The computing device 200 may also receive programming and data via network communications.

The computing device 200 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 execute both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
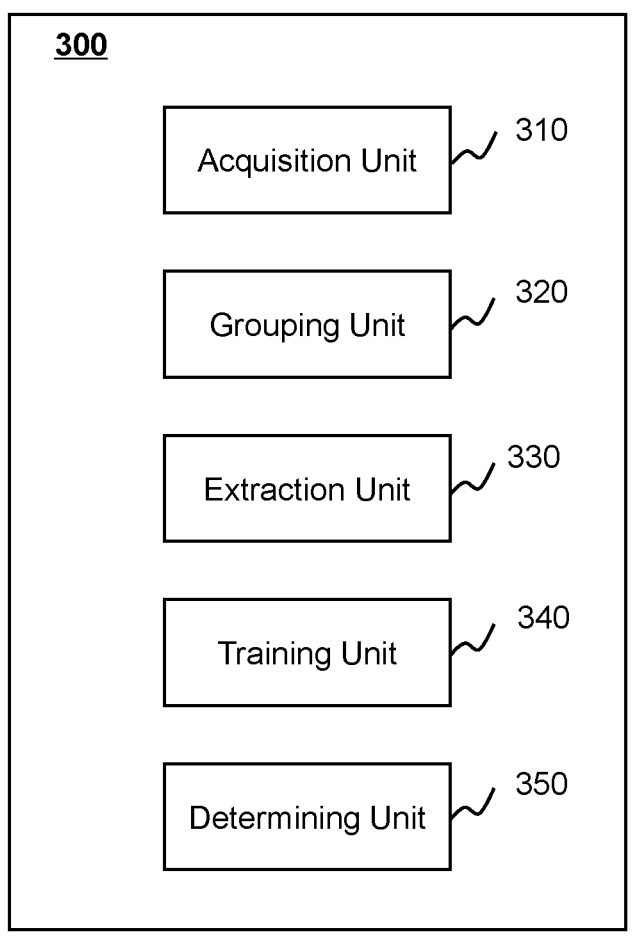
FIG. 3 is a block diagram of an exemplary processor for estimating time of arrival according to some embodiments of the present disclosure.

FIG. 3 is a block diagram of an exemplary processor 300 for estimating time of arrival according to some embodiments of the present disclosure. The processor 300 may be in communication with a computer-readable storage (e.g., a data storage 150, a passenger terminal 130, or a driver terminal 140, etc.), and may execute instructions stored in the computer-readable storage medium. The processor 300 may include an acquisition unit 310, a grouping unit 320, an extraction unit 330, a training unit 340, and a determining unit 350.

The acquisition unit 310 may obtain service request(s) associated with service requesters. The service request(s) may include information related to a target trip or one or more historical trips relating to a plurality of drivers. In some embodiments, the target trip may be associated with an order initiated by a user (e.g., a passenger) via the passenger terminal 130. In some embodiments, the target trip may include a trip between two or more locations. In some embodiments, the historical trips may relate to one or more orders having been completed. In some embodiments, the historical trips may include travels between each any two locations. The acquisition unit 310 may obtain the target trip or the historical trips through the passenger terminal 130 or the driver terminal 140. The acquisition unit 310 may obtain the historical trips from the data storage 150.

The grouping unit 320 may group the one or more historical trips obtained by the acquisition unit 310 into one or more groups, In some embodiments, the grouping unit 320 may group the one or more historical trips into the one or more groups based on data of links of routes relating to the one or more historical trips (e.g., the number of links of a route relating to a historical order).

The extraction unit 330 may extract data relating to the target trip or the one or more historical trips obtained by the acquisition unit 310. For example, the extraction unit 330 may extract characteristic data (also referred to as the "sample characteristic data") relating to the target trip. As another example, the extraction unit 330 may extract historical characteristic data and historical time of arrival data relating to the one or more historical trips. In some embodiments, the extraction unit 330 may extract a plurality of training trips based on the one or more historical trips. The plurality of training trips may be used to train a prediction model for estimating time of arrival.

The training unit 340 may train a model by the data extracted by the extraction unit 330. For example, the training unit 340 may train the prediction model for estimating time of arrival based on the one or more historical trips.

The determining unit 350 may determine the prediction model for estimating time of arrival. For example, the determining unit 350 may determine an estimated time of arrival relating to the target trip.

Figure 4:
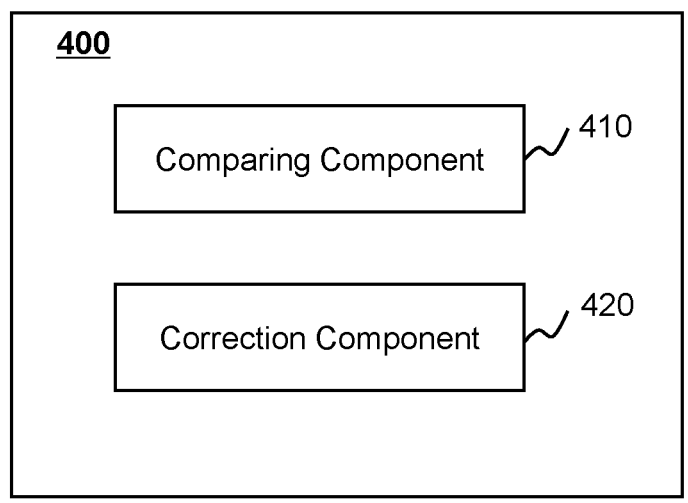
FIG. 4 is a block diagram of an exemplary training unit according to some embodiments of the present disclosure.

FIG. 4 is a block diagram of an exemplary training unit 400 according to some embodiments of the present disclosure. The training unit 400 may include a comparing component 410 and a correction component 420 according to some embodiments of the present disclosure.

The comparing component 410 may compare a match result with a predetermined value. For example, the comparing component 410 may also compare an error or a loss function generated during training the prediction model with a predetermined value to determine whether the training can be finished.

The correction component 420 may modify parameters of the prediction model. In some embodiments, the prediction model includes a time series model and a regression model. The correction component 420 may modify parameters corresponding to the time series model and parameters corresponding to the regression model during training the prediction model.

Figure 5:
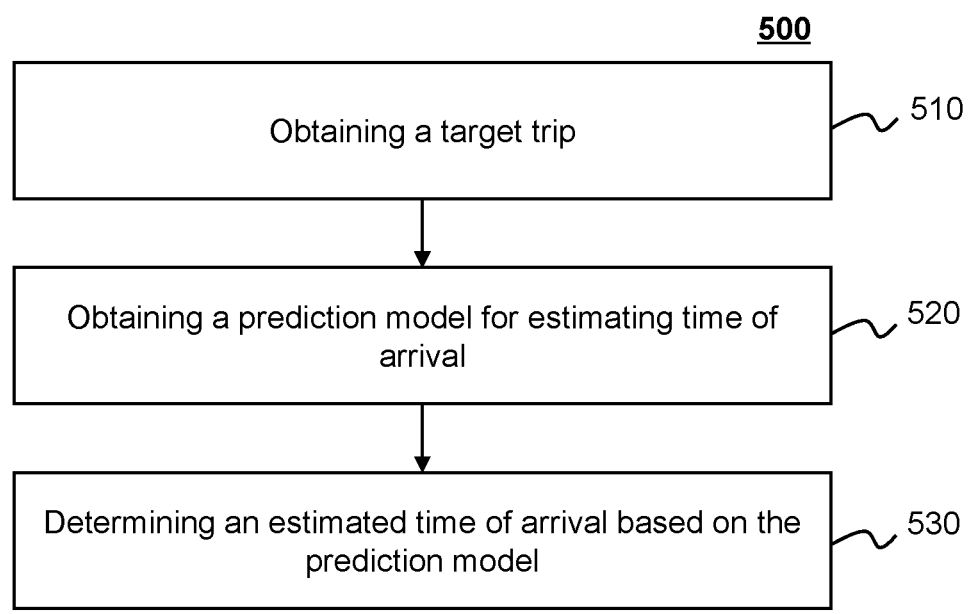
FIG. 5 is a flowchart of an exemplary process for determining an estimated time of arrival relating to a target trip according to some embodiments of the present disclosure.

FIG. 5 is a flowchart of an exemplary process 500 for determining an estimated time of arrival relating to a target trip according to some embodiments of the present disclosure. In some embodiments, the process 500 for determining the estimated time of arrival relating to the target trip may be implemented in the system 100 as illustrated in FIG. 1. In some embodiments, the process 500 may be implemented as one or more sets of instructions stored in data storage 150 and called and/or executed by the processing engine 112 or the processor 300. In some embodiments, the process 500 may be implemented in a user terminal and/or a server.

At 510, the processor 300 (e.g., the acquisition unit 310) may obtain information related to a target trip. The target trip may be a trip between one or more locations. In some embodiments, the target trip may be an order initiated by a user (e.g., a passenger) via the passenger terminal 130. The order may relate to a starting location and a destination. The target trip may be a trip between the starting location and the destination. In some embodiments, information and/or data associated with the target trip may include a starting location, a destination, a route from the starting location to the destination, a starting time, date data relating to the target trip, traffic data, user data relating to the target trip, travel mode data relating to the target trip, or the like, or any combination thereof. In some embodiments, the route from the starting location to the destination may include one or more links. Each of the links of the route may correspond to at least a portion of the route. The date data may include a year, a month, a day (e.g., a weekday, a weekend, a holiday), or the like. The traffic data may include a condition of jam, an average speed of traffic, human traffic, vehicle traffic, or the like, or any combination thereof. The user data relating to the target trip may include information and/or data about one or more users that may provide services related to the target trip, such as a driver that can fulfil a service order related to the target trip. The user data may include, for example, an user identifier, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof, etc.) or the like, or any combination thereof. A vehicle relating to the travel model may include a horse, a carriage, a rickshaw (e.g., a, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. The information and/or data relating to the target trip may be stored in the one or more user terminals (e.g., the one or more passenger terminals 130 or the one or more driver terminals 140). In some embodiments, the information and/or data relating to the target trip may be stored in the data storage 150. The information and/or data relating to the target trip may further be accessed by the server 110 via the network 120.

At 520, the processor 300 may obtain a prediction model for estimating time of arrival. In some embodiments, the prediction model may be trained in advance. Alternatively or additionally, the prediction model may be trained and/or updated in real time. The prediction model may be trained using one or more machine learning techniques, In some embodiments, the prediction model may be obtained by performing one or more operations described in connection with FIGS. 7A-8.

At 530, the processor 300 (e.g., the determining unit 350) may determine an estimated time of arrival relating to the target trip based on the prediction model, In some embodiments, the processor 300 may first determine a travel time for the route of the target trip. The processor 300 may then determine the estimated time of arrival based on the travel time and the starting time relating to the target trip. In some embodiments, the starting time may be designated by a user through the user terminal. In some embodiments, the processor 300 may determine an estimated time of arrival relating to an order for multiple users (e.g., multiple active drivers that can provide transportation services). Difference estimated times of arrival may be determined for different users based on user data related to the users (e.g., a driving speed). For example, the processor 300 can determine a first estimated time of arrival and a second estimated time of arrival for a first user and a second user, respectively. The first estimated time of arrival can be less than the second estimated time of arrival in some embodiments in which a first driving speed (e.g., an average driving speed) associated with the first user is higher than a second driving speed associated with the second user. In some embodiments, the processor 300 may determine a unified estimated time of arrival relating to the target order without considering the different user data associated with different users.

In some embodiments, based on the estimated time of arrival, the processor 300 may determine a suitable user (e.g., a driver) to fulfil the target order. In some embodiments, the processor 300 may determine an ETA relating to an order (also referred to herein as the "current order") that is being performed by a current driver. Based on the ETA relating to the current order, the processor 300 may determine whether a new order is suited to allocate to the current driver.

In some embodiments, the processor 300 may determine whether two or more orders can be combined based on at least one ETA relating to at least one of the two or more orders. For example, the processor 300 may receive a first order (the target order) and a second order. The first order may correspond to a first starting location, a first destination location, and a first starting time. The second order may correspond to a second starting location, a second destination, and a second starting time. The first starting time is earlier than the second starting time. The processor 300 may determine a first ETA relating to a route between the first starting location and the first destination. The processor 300 may also determine a second ETA relating to a route between the first destination and the second starting location. The processor 300 may determine whether to combine the first order and the second order together based on at least one of the first ETA or the second ETA. If the processor 300 determines that the first order and the second order can be combined together, the processor 300 may allocate the first order and the second order to a same driver.

Figure 6:
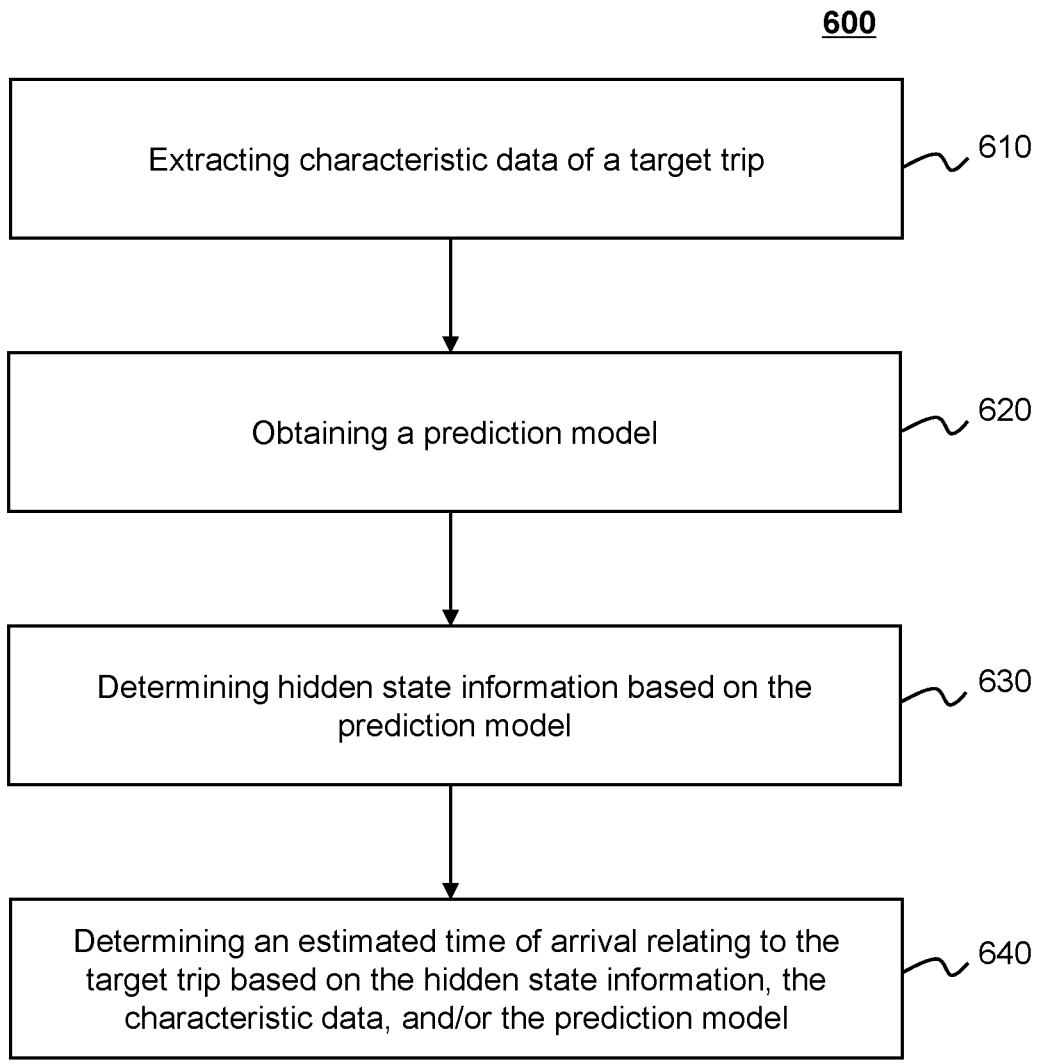
FIG. 6 is a flowchart of another exemplary process for determining an estimated time of arrival relating to a target trip according to some embodiments of the present disclosure.

FIG. 6 is a flowchart of another exemplary process 600 for determining an estimated time of arrival relating to a target trip according to some embodiments of the present disclosure. In some embodiments, the process 600 may be implemented in the system 100 as illustrated in FIG. 1, In some embodiments, the process 600 may be implemented as one or more instructions stored in the data storage 150 and called and/or executed by the processing engine 112 or the processor 300. In some embodiments, the process 600 may be implemented in a user terminal and/or a server.

At 610, the processor 300 (e.g., the extraction unit 330) may extract characteristic data of a target trip (also referred to as the "sample characteristic data"). In some embodiments, the sample characteristic data may include first feature data and second feature data. The first feature data used herein may refer to data relating to one or more features associated with a route of the target trip. For example, the first feature data may include a starting location of the route, a destination of the route, data about one or more traffic lights relating to the route, the number of links of the route, data about one or more intersections in the route, timing data relating to the route, traffic data, user data relating to the route, travel mode data relating to the route, or the like, or any combination thereof. The timing data may include a year, a month, a day (e.g., a weekday, a weekend, a holiday), a time instant, or the like. The traffic data may include a condition of jam, an average speed of traffic, human traffic, vehicle traffic, or the like, or any combination thereof. The user data relating to the route may include information and/or data about one or more users that may provide services related to the route, such as a driver that can fulfil a service order related to the route. The user data may include, for example, a user identifier, a name, a nickname, a gender, an age, a telephone number, an occupation, a rank, time of use, driving experience, a vehicle age, a license plate number, a driver's license number, a certification status, user habits/preferences, additional service capabilities (additional features such as the size of the trunk of the car, a panoramic sunroof, etc.) or the like, or any combination thereof. A vehicle relating to the travel model may include a horse, a carriage, a rickshaw (e.g., a, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. The data about one or more traffic lights may include the number of the traffic lights, a status of the traffic lights, or the like. The data about one or more intersections may include the number of the intersections, traffic data of the intersections, or the like.

In some embodiments, the second feature data used herein may refer to data relating to one or more features associated with one or more links of the route of the target trip. The route can be segmented into one or more portions based on map data related to the route (e.g., a map of the route). Each of the links may correspond to a portion of the route. In some embodiments, the route may be segmented into multiple links based on one or more predetermined computer-implemented rules. In some embodiments, the route may be segmented into multiple groups of links using different techniques. The second feature data relating to the target trip may include feature data corresponding to each link of the route. The feature data corresponding to a link may include identifying data relating to the link (e.g., an identification), data about one or more traffic lights relating to the link, data about one or more intersections relating to the link, timing data relating to the link, traffic data relating to the link, user data relating to the link, travel mode data relating to the link, or the like, or any combination thereof. The identifying data of the link can include any information that can be used to identify the link, such as a unique identifier of the link. The timing data relating to each link of the route may include a year, a month, a day (e.g., a weekday, a weekend, a holiday), a time instant, or the like. The traffic data relating to each link of the route may include a condition of jam, an average speed of traffic, human traffic, vehicle traffic, or the like, or a combination thereof. The user data relating to each link of the route may include information and/or data about a user that may fulfil an order relating to the link (e.g., by providing transportation service for a route including the link). The information and/or data about a user may include a user identifier, a name, a nickname, a gender, an age, a telephone number, an occupation, a rank, time of use, driving experience, a vehicle age, a license plate number, a driver's license number, a certification status, user habits/preferences (a usual speed of driving), additional service capabilities (additional features such as the size of the trunk of the car, a panoramic sunroof, etc.) or the like, or any combination thereof. A vehicle relating to the travel model relating to each link of the route may include a horse, a carriage, a rickshaw (e.g., a, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. The data about one or more traffic lights relating to each link of the route may include the number of the lights of the link, a status of the traffic lights of the link, or the like. The data about one or more intersections relating to each link of the route may include the number of the intersections of the link, the traffic data of intersections of the link, or the like. In some embodiments, the second feature data of the target trip may be a time sequence composed by feature data corresponding to each link of the route in time order. In some embodiments, the processor 300 may generate one or more feature vectors for one or more links of a route. For example, the processor can generate a first feature vector based on an identification of the link, a user identifier (e.g., an identifier of a driver), etc. In some embodiments, the first feature vector may be an embedding vector. As another example, the processor can generate a second feature vector based on one or more discrete features, e.g., timing information relating to the link, an index of a day of a week, etc. In some embodiments, the processor 300 may process the second feature vector to generate a one-hot vector. As still another example, the processor can generate a third feature vector based on one or more numerical features, e.g., a real-time velocity relating to the link, an ETA relating to the link, etc. In some embodiments, the second feature data of the target trip may include one or more of the first feature vector, the second feature vector, and/or the third feature vector.

At 620, the processor (e.g., the acquisition unit 310) may obtain a prediction model. In some embodiments, the prediction model may include a time series model and a regression model. The time series model may include a recurrent neural network, a convolutional neural network, a hidden Markov model, a perceptron neural network, a Hopfield network, a self-organizing map (SOM), or a learning vector quantization (LVQ), or the like, or any combination thereof. The regression model may include a multilayer perceptron neural network, a boosting algorithm model, a logistic regression model, a stepwise regression model, a multivariate adaptive regression spline, a locally estimated scatterplot smoothing, or the like, or any combination thereof.

At 630, the processor 300 (e.g., the determining unit 350) may determine hidden state information based on the prediction model. In some embodiments, the hidden state information may be determined based on the prediction model (e.g., a time series model) and the second feature data. For example, the processor 300 can process the second feature data based on the prediction model (e.g., the time series model) to output the hidden state information. More particularly, for example, feature data corresponding to the links of the route in the time sequence may be inputted in the time series model in time order. The processor 300 may generate a first output by processing feature data corresponding to a first link using the time series model (e.g., a recurrent neural network). Then, feature data corresponding to a second link in the time sequence and the first output may be inputted in the time series model to generate a second output. The feature data of the other links may be processed in a similar manner. When feature data corresponding to the last link is inputted in the time series model, a final output will be generated. In some embodiments, the hidden state information may be the final output of the time series model. In some embodiments, the feature data of the links may be processed using the time series model (e.g., the recurrent neural network) in an order determined based on identifications of the links.

At 640, the processor 300 (e.g., the determining unit 350) may determine the estimated time of arrival relating to the target trip based on the hidden state information, the characteristic data, and/or the prediction model. In some embodiments, the hidden state information generated at 630, and the first feature data relating to the target trip may be inputted to a regression model to determine the estimated time of arrival relating to the target trip. The regression model may include a multilayer perceptron neural network.

Figure 7A:
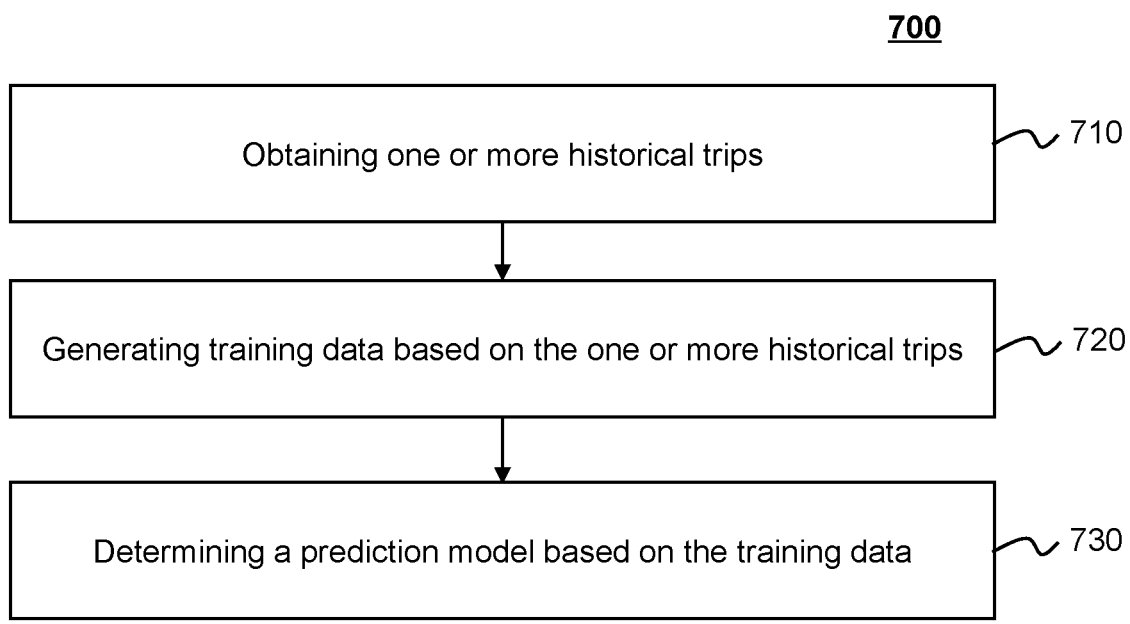
FIG. 7A is a flowchart of an exemplary process for determining a prediction model according to some embodiments of the present disclosure.

FIG. 7A is a flowchart of an exemplary process 700 for determining a prediction model according to some embodiments of the present disclosure. In some embodiments, the process 700 may be implemented in the system 100 as illustrated in FIG. 1. In some embodiments, the process 700 may be implemented as one or more instructions stored in the data storage 150 and called and/or executed by the processing engine 112 or the processor 300. In some embodiments, the process 700 may be implemented in a user terminal and/or a server.

At 710, the processor 300 (e.g., the acquisition unit 310) may obtain information relating to one or more historical trips. The historical trips may relate to one or more historical orders. Each of the historical trips can include a trip between one or more locations. In some embodiments, the historical orders may be associated with particular users of an online service platform (e.g., a certain number of drivers of a transportation service platform, drivers that are available to provide services at a particular time). The historical trips may include trips during a particular time period, e.g., last two months, last six months, last ten months, last one year, last two years, etc. The historical trips may include trips on weekends or in workdays. As another example, the historical trips may include orders during a given time of day (e.g., in the morning, in the afternoon, in the night). The historical trips may include trips in one or more particular locations (e.g., a city, a district of a city).

The processor 300 may obtain data about the one or more historical trips from the data storage 150. The information and/or data relating to the one or more historical trips may also be accessed by the server 110 via the network 120. In some embodiments, the information and/or data relating to the one or more historical trips may be stored in the user terminal (e.g., the passenger terminals 130 or the driver terminal 140). For example, the information and/or data relating to the historical trips may usually be generated and recorded in location-based service (LBS) applications (e.g., a driving application, a map application, a navigation application, a social media application, etc.). As another example, the information and/or data related to the one or more historical trips may be recorded by the historical map information downloaded by the LBS applications.

In some embodiments, the information and/or data relating to the one or more historical trips may include characteristic data of the historical trips (also referred to herein as "historical characteristic data"). The historical characteristic data may include data relating to one or more features corresponding to routes relating to the historical trips (also referred to herein as the "first historical feature data") and/or data relating to one or more features corresponding to one or more links relating to the historical trips (also referred to herein as the "second historical feature data"). The first historical feature data relating to a historical trip may include a starting location of a route relating to the historical trip, a destination of the route relating to the historical trip, data about one or more traffic lights relating to the route relating to the historical trip, the number of links of the route relating to the historical trip, data about one or more intersections in the route relating to the historical trip, timing data relating to the route of the historical trip, traffic data, user data relating to the route of the historical trip, travel mode data relating to the route of the historical trip, or the like, or any combination thereof. The timing data may include a year, a month, a day (e.g., a weekday, a weekend, a holiday), a time instant, or the like. The traffic data may include a condition of jam, an average speed of traffic, human traffic, vehicle traffic, or the like, or any combination thereof. The user data relating to the route may include information and/or data about a user that may drive a vehicle to perform the target trip, e.g., a user identifier, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof, etc.) or the like, or any combination thereof. A vehicle relation to the travel model may include a horse, a carriage, a rickshaw (e.g., a, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. The data about one or more traffic lights may include the number of the lights, a status of the traffic lights, or the like. The data about one or more intersection may include the number of the intersections, the traffic data of intersections, or the like.

In some embodiments, the second historical feature data relating to a historical trip may include data about one or more links of a route of the historical trip. In some embodiments, the second historical feature data relating to the historical trip may include feature data corresponding to each link of the route relating to the historical trip. The feature data corresponding to a link of the route relating to the historical trip may include identifying data relating to the link (e.g., an identification), data about one or more traffic lights relating to the link, data about one or more intersections relating to the link, timing data relating to the link, traffic data relating to the link, user data relating to the link, travel mode data relating to the link, or the like, or any combination thereof. The identifying data of the link can include any information that can be used to identify the link, such as a unique identifier of the link. The timing data relating to each link of the route may include a year, a month, a day (e.g., a weekday, a weekend, a holiday), or the like. The traffic data relating to each link of the route relating to the historical trip may include a condition of jam, an average speed of moving, human traffic, vehicle traffic, or the like, or a combination thereof. The user data relating to each link of the route relating to the historical trip may include information and/or data about a user that may fulfil an order relating to the link (e.g., by providing transportation service for a route including the link). The information and/or data about a user may include an identity symbol, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof, etc.) or the like, or any combination thereof. A vehicle relating to the travel model relating to each link of the route relating to the historical trip may include a horse, a carriage, a rickshaw (e.g., a, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. The data about traffic lights relating to each link of the route relating to the historical trip may include the number of the lights of the link, a status of the traffic lights of the link, or the like. The data about one or more intersections relating to each link of the route relating to the historical trip may include the number of the intersections of the link, the traffic data of intersections of the link, or the like.

In some embodiments, the processor 300 may generate one or more feature vectors for one or more links of a route relating to a historical trip. For example, the processor 300 may generate a first historical feature vector based on an identification of the link, the user identifier (e.g., an identifier of a driver), etc. In some embodiments, the first historical feature vector may be an embedding vector. As another example, the processor 300 may generate a second historical feature vector based on one or more discrete features, e.g., timing information relating to the link, an index of a day of a week, etc. In some embodiments, the processor 300 may process the second historical feature vector to generate a one-hot vector. As still another example, the processor 300 may generate a third historical feature vector based on one or more numerical features, e.g., a real-time velocity relating to the link, an ETA relating to the link, etc. In some embodiments, the second historical feature data of the historical trip may include one or more of the first historical feature vector, the second historical feature vector, and/or the third historical feature vector.

The processor 300 may also obtain time of arrival relating to each of the historical trips (also referred to herein as "historical time of arrival data"). The time of arrival relating to each of the historical trips may be an actual time at which a historical trip was completed.

At 720, the processor 300 may generate training data based on data about the one or more historical trips (e.g., the historical characteristic data and the historical time of arrival data). In some embodiments, the training data may include historical characteristic data and historical time of arrival data relating to the historical trips. In some embodiments, the training data may include data extracted from one or more of the historical trips (also referred to herein as the "training trips"). The training trips can be selected from the historical trips based on any suitable criterion and/or criteria. For example, the processor 300 may select historical trips occurred in a particular period of time (e.g., one year, one month, one day) from the one or more historical trips as the training trips. As another example, the processor 300 may select historical trips occurred in a particular location (e.g., a city, a district of a city) from the one or more historical trips as the training trips. In some embodiments, the training data may include historical characteristic data and historical time of arrival data relating to the training trips. In some embodiments, the historical characteristic data relating to the training data may include data about routes relating to the training trips, data about one or more links relating to the training trips, data about actual times of arrival relating to the training trips, etc.

In some embodiments, the number of links of a route relating to each of the training trips may satisfy one or more conditions. For example, the number of links may be less than a first threshold. As another example, the number of links may be greater than a second threshold. As still another example, the number of links may fall within a range (e.g., a range between the first threshold and the second threshold). As yet another example, the difference between the greatest number of links of a route relating to the training trips and the least number of links of a route related to the training trips does not exceed a preset threshold value. The preset threshold value may be any reasonable value.

At 730, the processor 300 (e.g., the determining unit 350) may determine the prediction model based on the training data. Based on the prediction model, the processor 300 may determine an estimated time of arrival relating to the target trip by performing one or more operations described in connection with processes 500 and/or 600.

Figure 7B:
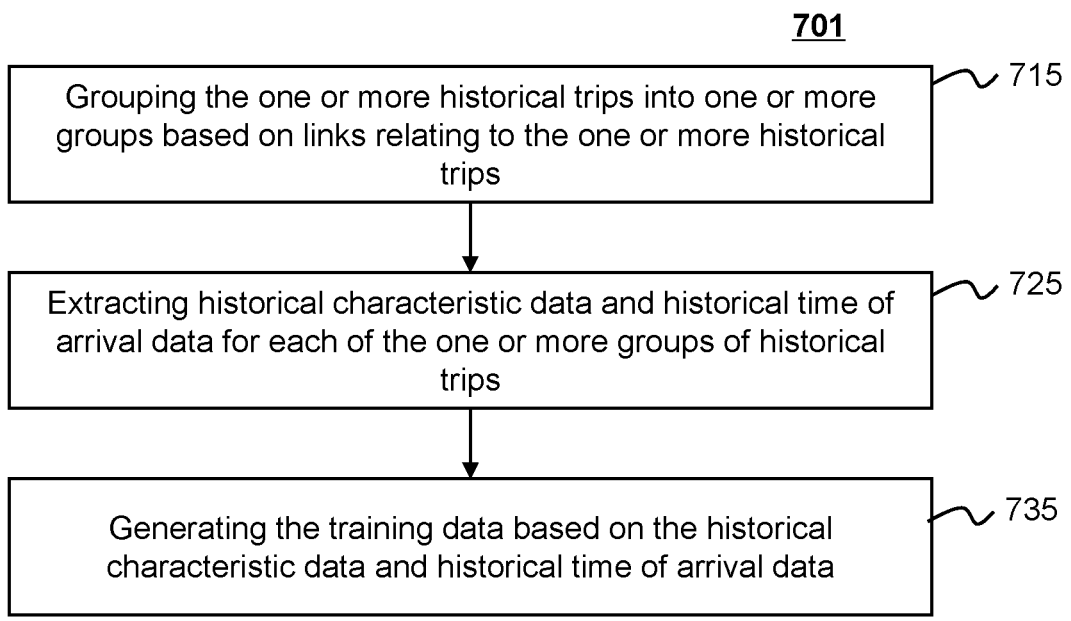
FIG. 7B is a flowchart of another exemplary process for determining training data according to some embodiments of the present disclosure.

FIG. 7B is a flowchart of an exemplary process 701 for generating training data according to some embodiments of the present disclosure. In some embodiments, the process 701 may be implemented in the system 100 as illustrated in FIG. 1. In some embodiments, the process 701 may be implemented as one or more instructions stored in the data storage 150 and called and/or executed by the processing engine 112 or the processor 300. In some embodiments, the process 701 may be implemented in a user terminal and/or a server.

At 715, the processor 300 (e.g., the grouping unit 320) may group the one or more historical trips into one or more groups based on links relating to the one or more historical trips. In some embodiments, the routes corresponding to the historical trips may include different numbers of links. The processor 300 may divide the historical trips into one or more groups based on the numbers of links associated with the historical trips. Each of the groups may correspond to a particular number of links and/or a range of numbers of links. In some embodiments, one or more ranges of numbers of links may be determined based on a greatest number of links related to the historical trips and/or a least number of links related to the historical trips. For example, one or more ranges may be determined by splitting a range between the greatest number of links and the least number of links into one or more portions. For example, the number of links may be divided into three ranges (e.g., [1, 10], [11, 20], [21, 3]). Then, the processor 300 (e.g., the grouping unit 320) may group the historical trips into three groups (e.g., group A, group B, and group C) based on the numbers of links accordingly. For example, historical trips with the numbers of links in the range [1, 10] may be grouped into group A. Historical trips with the numbers of links in the range [11, 20] may be grouped into group B. Historical trips with the numbers of links in the range [21, 30] may be grouped into group C.

At 725, the processor 300 (e.g., the extraction unit 330) may extract historical characteristic data and historical time of arrival data for each of the one or more groups of historical trips.

At 735, the processor 300 may generate training data based on the historical characteristic data and the historical time of arrival data for each of the one or more groups of historical trips. The processor 300 may determine a prediction model based on the historical characteristic data and the historical time of arrival data in the groups. In some embodiments, for each group, the processor 300 may determine an ETA determination module. In some embodiments, the processor 300 may determine an ETA determination model based on the historical characteristic data and the historical time of arrival data for the groups. For example, a process for training a prediction model may include several stages. At different stages, historical characteristic data and historical time of arrival data corresponding to different groups may be used. In some embodiments, the processor 300 may exact a portion of historical characteristic data and historical time of arrival data from each group to generate the training data.

The processor 300 (e.g., the determining unit 350) may determine the prediction model based on the training data according to some embodiments of the present disclosure. Based on the prediction model, the processor 300 may determine the estimated time of arrival relating to the target trip (e.g., by performing one or more operations described in connection with processes 500 and/or 600).

Figure 8:
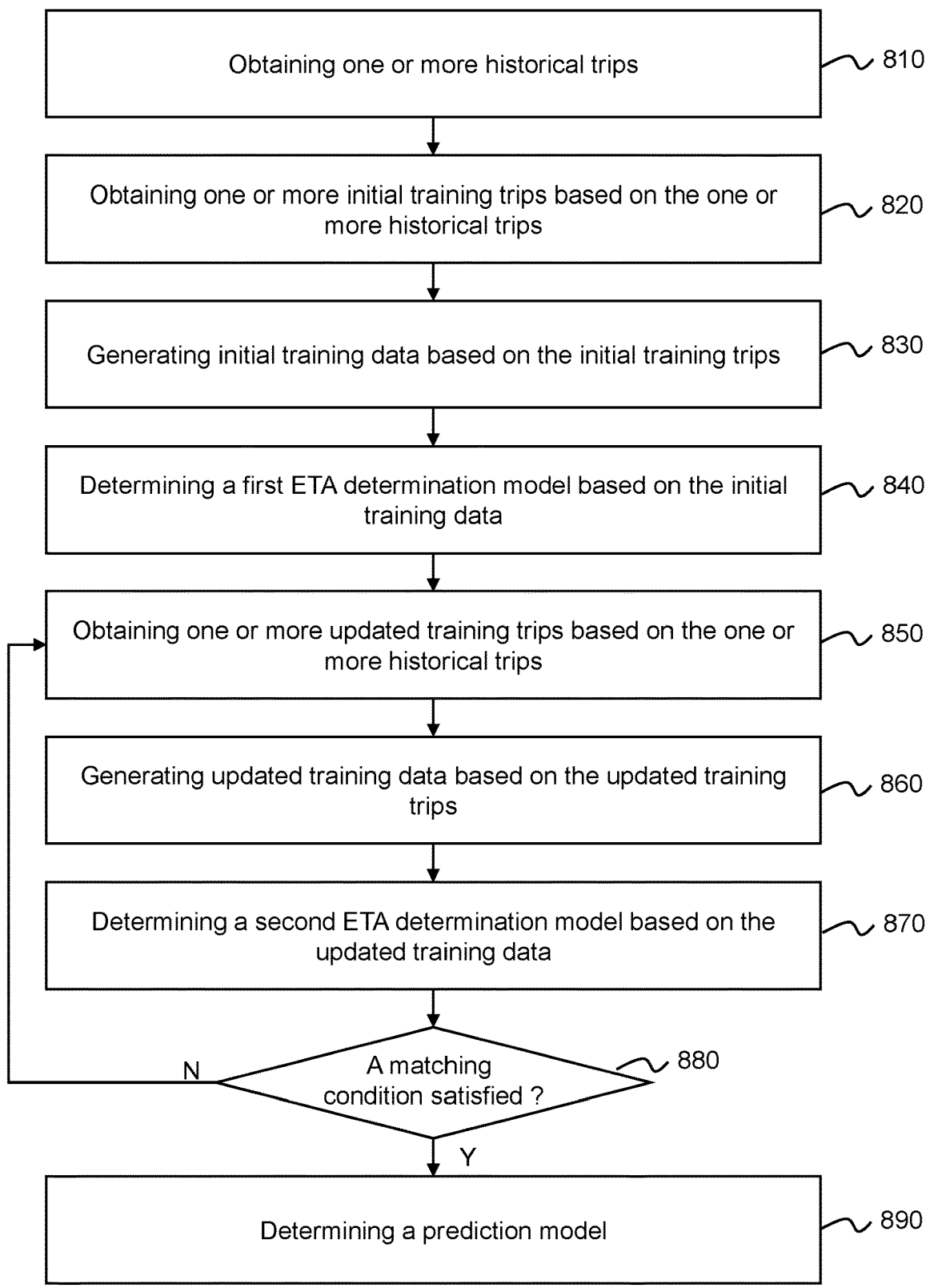
FIG. 8 is a flowchart of an exemplary process for determining the prediction model according to some embodiments of the present disclosure.

FIG. 8 is a flowchart of an exemplary process 800 for determining the prediction model according to some embodiments of the present disclosure. In some embodiments, the process 800 for determining the prediction model may be implemented in the system 100 as illustrated in FIG. 1. In some embodiments, the process 800 may be implemented as one or more instructions stored in the data storage 150 and called and/or executed by the processing engine 112 or the processor 300. In some embodiments, the process 800 may be implemented in a user terminal and/or a server.

At 810, the processor 300 (e.g., the acquisition unit 310) may obtain one or more historical trips. For example, one or more operations described in connection with step 710 may be performed.

At 820, the processor 300 may obtain one or more initial training trips (also referred to herein as "a first plurality of training trips") based on the one or more historical trips. In some embodiments, the processor 300 may select one or more trips from the historical trips as the initial training trips. In some embodiments, the processor 300 may divide the one or more historical trips into one or more groups. The processor 300 may then select historical trips in one group as the initial training trips. The historical trips may be divided, for example, by performing one or more operations described in connection with step 715. In some embodiments, the processor 300 may select one or more historical trips from one or more of the groups to generate the initial training trips.

At 830, the processor 300 (e.g., the extraction unit 330) may generate initial training data based on the initial training trips. In some embodiments, the initial training data may include characteristic data relating to the initial training trips (also referred to herein as "first historical characteristic data") and time of arrival relating to the initial training trips (also referred to herein as "first historical time of arrival data").

At 840, the processor 300 (e.g., the determining unit 350) may determine a first ETA determination model based on the initial training data. The first ETA determination model may include at least one of a time series model or a regression model. The time series model trained in advance may include a recurrent neural network, a convolutional neural network, a hidden Markov model, a perceptron neural network, a Hopfield network, a self-organizing map (SOM), or a learning vector quantization (LVQ), or the like, or any combination thereof. The regression model may include a multilayer perceptron neural network, a boosting algorithm, a logistic regression model, a stepwise regression model, a multivariate adaptive regression spline, a locally estimated scatterplot smoothing, or the like, or any combination thereof.

At 850, the processor 300 (e.g., the acquisition unit 310) may obtain one or more updated training trips (also referred to as "a second plurality of the training trips") based on the one or more historical trips. The determination of the second plurality of training trips may be made by performing one or more operations described in connection with 820.

At 860, the processor 300 may generate updated training data based on the update training trips. The updated training data may include historical characteristic data relating to the updated training trips and historical time of arrival data relating to the updated training trips.

At 870, the processor 300 (e.g., the determining unit 350) may determine a second ETA determination model based on the updated training data. In some embodiments, the processor 300 (e.g., the correction component 420 in the training unit 340) may modify at least one parameter of the first ETA determination model (e.g., at least one of the time serial model or the regression model) based on the second historical characteristic data and the second historical time of arrival data to determine the second ETA determination model. For example, the processor 300 may determine an estimated time of arrival for each of the second plurality of the training trips based on the first ETA determination model and the historical characteristic data relating to the updated training trips. The processor 300 may then compare the estimated times of arrival of the second plurality of the training trips with the second historical time of arrival data. The processor 300 can generate a comparison result based on the comparison. The comparison result may indicate a difference between the estimated times of arrival of the second plurality of the training trips and the second historical time of arrival. The processors 300 may determine whether to modify the parameters in the first ETA determination model based on the comparison result and can determine an adjustment value for modifying at least one parameter of the first ETA determination model. In some embodiments, the processor 300 can generate a relatively great adjustment value in response to determining a relatively great difference between the estimated times of arrival of the second plurality of the training trips and the second historical time of arrival data. Similarly, the processor 300 can generate a relatively small adjustment value in response to determining a relatively small difference between the estimated times of arrival of the second plurality of the training trips and the second historical time of arrival data.

At 880, the processor 300 may determine whether a matching condition is satisfied. In some embodiments, if the matching condition is satisfied, the processor 300 may determine the second ETA determination model as the prediction model. If the matching condition is not satisfied, the processor 300 may perform step 850 to step 880 again to obtain new training data to train the model to determine the prediction model.

In some embodiments, the matching condition may include determining whether a loss function converges to a first value. The loss function may be determined based on the first ETA determination model and/or the second ETA determination model. For example, if the loss function converges to the first value, the processor 300 may determine the second ETA determination model as the prediction model at 890. If the loss function does not converges to the first value, the processor 300 may go back to 850 again.

In some embodiments, the matching condition may include determining whether an error is less than a second value. The error may be determined based on a third plurality of historical trips (also referred to as "testing trips") from the one or more historical and the second ETA determination model. For example, the processor 300 may select the third plurality of trips from the one or more historical trips. The third plurality of trips may be different from the initial training trips and the updated training trips. The processor 300 (e.g., the extraction unit 330) may extract characteristic data relating to the testing trips (also referred to herein as "third historical characteristic data") and time of arrival relating to the third plurality of historical trips (also referred to herein as "third historical time of arrival data").

The third historical characteristic data may include feature data corresponding to a route relating to each of the third plurality of historical trips and feature data corresponding to one or more links of the route relating to each of the third plurality of historical trips. Based on the third historical characteristic data and the second ETA determination, the processor 300 (e.g., the determining unit 350) may determine an estimated time of arrival relating to the third plurality of historical trips. Then the processor 300 may determine the error between the estimated time of arrival relating to the third plurality of historical trips and the third historical time of arrival data relating to the third plurality of historical trips. If the error is less than the second value, the processor 300 may determine the second ETA determination model as the prediction model at 890. If the error is not less than the second value, the processor 300 may loop back to 850.

In some embodiments, the matching condition may include determining whether the error is less than the second value and determining whether the loss function converges to the first value. The second value and the loss function may be any reasonable value.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system configured to operate an online transportation service platform, comprising:
    a bus;
    a storage medium electronically connected to the bus, including a set of instructions for estimating time of arrival;
    logic circuits in communication with the storage medium via the bus, wherein when executing the set of instructions, the logic circuits are directed to:
    extract sample characteristic data relating to a target trip, wherein the sample characteristic data comprises first feature data corresponding to a route relating to the target trip and second feature data corresponding to a link of the route;
    obtain a prediction model for estimating time of arrival; and
    determine an estimated time of arrival (ETA) relating to the target trip based on the prediction model and the sample characteristic data. wherein, to obtain the prediction model, the logic circuits are directed to:
    generate training data based on one or more historical trips; and
    determine the prediction model based on the training data, wherein, to determine the prediction model, the logic circuits are directed to:
    identify, from the one or more historical trips, a first plurality of training trips and a second plurality of training trips;
    extract first historical characteristic data and first historical time of arrival data relating to the first plurality of training trips;
    determine a first ETA determination model based on the first historical characteristic data and the first historical time of arrival;
    extract second historical characteristic data and second historical time of arrival data relating to the second plurality of training trips; and
    modify the first ETA determination model based on the second historical characteristic data and the second historical time of arrival data to determine a second ETA determination model.

2. The system of claim 1, wherein the link of he route corresponds to at least a portion of the route.

3. The system of claim 1, wherein, to determine the estimated time of arrival relating to the target trip, the logic circuits are further directed to:
    determine hidden state information based on the prediction model and the second feature data; and
    determine the estimated time of arrival relating to the target trip based at least in part on the hidden state information.

4. The system of claim 1, wherein, to obtain the prediction model, the logic circuits are further directed to:
    group the one or more historical trips into one or more groups based on data of links relating to the one or more historical trips, wherein the one or more historical trips are associated with a plurality of routes comprising the links;
    extract historical characteristic data and historical time of arrival data for each of the one or more groups of historical trips; and
    generate the training data based on the historical characteristic data and the historical time of arrival data.

5. The system of claim 1, wherein, to determine the prediction model, the logic circuits are further directed to:
    determine whether a matching condition is satisfied based on at least one of the first ETA determination model or the second ETA determination model; and
    in response to determining that the matching condition is satisfied, determining the second ETA determination model as the prediction model.

6. The system of claim 5, wherein, to determine whether the matching condition is satisfied, the logic circuits are directed to:
- determine a loss function based on at least one of the first ETA determination model or the second ETA determination model; and
- determine whether the loss function converges to a first value.

7. The system of claim 5, wherein, to determine whether the matching condition is satisfied, the logic circuits are directed to:
- select, from the one or more historical trips, a third plurality of historical trips;
- determine an error based on third historical characteristic data and third historical time of arrival data relating to the third plurality of historical trips; and
- determine whether the error is less than a second value.

8. The system of claim 1, wherein the prediction model comprises at least one of a time series model or a regression model.

9. The system of claim 8, wherein the time series model comprises a recurrent neural network.

10. The system of claim 8, wherein the regression model comprises a multilayer perceptron.

11. A method configured to operate an online transportation service platform, comprising:
- extracting, by a processor, sample characteristic data relating to a target trip, wherein the sample characteristic data comprises first feature data corresponding to a route relating to the target trip and second feature data corresponding to a link of the route;
- obtaining, by the processor, a prediction model for estimating time of arrival; and
- determining, by the processor, an estimated time of arrival (ETA) relating to the target trip based on the prediction model and the sample characteristic data, wherein obtaining the prediction model comprises:
  - generating training data based on one or more historical trips; and
  - determining the prediction model based on the training data, wherein determining the prediction model comprises:
    - identifying, from the one or more historical trips, a first plurality of training trips and a second plurality of training trips;
    - extracting first historical characteristic data and first historical time of arrival data relating to the first plurality of training trips:
    - determining a first ETA determination model based on the first historical characteristic data and the first historical time of arrival:
    - extracting second historical characteristic data and second historical time of arrival data relating to the second plurality of training trips; and
    - modifying the first ETA determination model based on the second historical characteristic data and the second historical time of arrival data to determine a second ETA determination model.

12. The method of claim 11, wherein the link of the route corresponds to at least a portion of the route.

13. The method of claim 11, wherein determining the estimated time of arrival relating to the target trip further comprises:
- determining hidden state information based on the prediction model and the second feature data; and
- determining the estimated time of arrival relating to the target trip based at least in part on the hidden state information.

14. The method of claim 11, further comprising:
- grouping the one or more historical trips into one or more groups based on data of links relating to the one or more historical trips, wherein the one or more historical trips are associated with a plurality of routes comprising the links;
- extracting historical characteristic data and historical time of arrival data for each of the one or more groups of historical trips; and
- generating the training data based on the historical characteristic data and the historical time of arrival data.

15. The method of claim 11, further comprising:
- determining whether a matching condition is satisfied based on at least one of the first ETA determination model or the second ETA determination model; and
- in response to determining that the matching condition is satisfied, determining the second ETA determination model as the prediction model.

16. The method of claim 15, wherein determining whether the matching condition is satisfied comprises:
- determining a loss function based on at least one of the first ETA determination model or the second ETA determination model; and
- determining whether the loss function converges to a first value.

* * * * *